May 31, 1966　　　　　　　C. E. BRADLEY　　　　　　　3,253,658
　　　　　　　　　　　　　TORQUE METER
Filed June 3, 1965　　　　　　　　　　　　　　　6 Sheets-Sheet 1

Fig.1

INVENTOR.
CURTIS E. BRADLEY
BY
Herschel C. Omohundro
ATTORNEY

May 31, 1966 C. E. BRADLEY 3,253,658
TORQUE METER
Filed June 3, 1965 6 Sheets-Sheet 2

Fig.2

INVENTOR.
CURTIS E. BRADLEY
BY
Herschel C. Omohundro
ATTORNEY

United States Patent Office 3,253,658
Patented May 31, 1966

3,253,658
TORQUE METER
Curtis E. Bradley, Phoenix, Ariz., assignor to The Garrett Corporation, Los Angeles, Calif., a corporation of California
Filed June 3, 1965, Ser. No. 461,080
13 Claims. (Cl. 170—135.72)

This application is a continuation-in-part of my application Serial No. 313,905, filed October 4, 1963, for Torque Meter, now abandoned. The invention set forth herewith relates to means for continuously registering the relative angular positions of torsionally coupled engine and load elements while they are both rotating. More particularly, the present device relates to a torque sensor for use on turboprop engines to provide a torque responsive propeller pitch control system and to indicate the power output of the engine.

In general, the present mechanism includes, first, means for translating the relative angular deflection of torsionally coupled elements into linear motion, and second, means proportionally responsive to this linear motion for automatically generating a control or measuring force that is transmitted to a suitable actuator or gauge. The first-mentioned means comprises a two-part sensor mechanism having one of its parts disposed for unitary rotation with the rotary portion of the engine and the other of its parts similarly connected to the load. Both of said sensor parts are joined together by meshing helical surfaces which translate any differential rotary movement between the engine and the load into proportional linear displacement of one sensor part. The means responsive to the motion translating mechanism comprises a hydraulic system which will act to limit negative torque, that is, torque which is transmitted from the load back to the engine. A part of the same or another hydraulic system responsive to the motion translating mechanism is also utilized to give an indication of the amount of positive torque.

It is an object of the present invention to provide an integrated mechanical torque sensor and hydraulically actuated load control device.

Another object of the invention is to provide the combination of a mechanical torque sensor and hydraulic means responsive to changes in the torque sensed, the hydraulic means being capable of indicating the magnitude of the sensed torque and providing a control force which is proportional to the torque.

A further object of the invention is to provide an integrated mechanical torque sensor and hydraulic propeller pitch control mechanism.

A still further object of the present invention is to provide a propeller pitch control mechanism which is responsive to the actual force imposed between the engine and load as measured by a sensor connected directly between the engine output shaft and propeller drive.

Yet another object of the invention is to provide a single torque sensor in association with a turboprop engine which is capable of producing an indication of positive torque when the engine is driving the propeller and capable of generating a control force which will adjust the pitch of the propeller to avoid excessive negative torque when the propeller is tending to drive the engine.

Another object of the invention is to provide a torque meter having a pair of torque sensing elements fixed for rotation with engine parts which are releatively angularly disposed in response to the application of power by the engine to a load, the sensing elements having means therebetween to translate relative rotary motion into longitudinal movement bearing a predetermined relationship to such power and to utilize the longitudinal movement to generate a signal or perform a controlling operation.

A further object of the invention is to provide the torque meter referred to in the preceding paragraph with valve means disposed in coaxial relationship with the torque sensing elements and operated by the longitudinal movement of one element to control the flow of a hydraulic fluid whereby a desired fluid pressure signal will be created.

Another object of the invention is to provide motion transmitting means between the engine parts and the torque sensing elements of the torque meter referred to in the two preceding paragraphs, so that the torque meter may be positioned laterally with relation to the axis of the engine and still have the torque sensing elements rotate with and be driven by the selected engine parts.

Further objects and advantages of the invention will become apparent with an understanding gained from reading the following detailed description and appended drawings, wherein.

Figure 1:
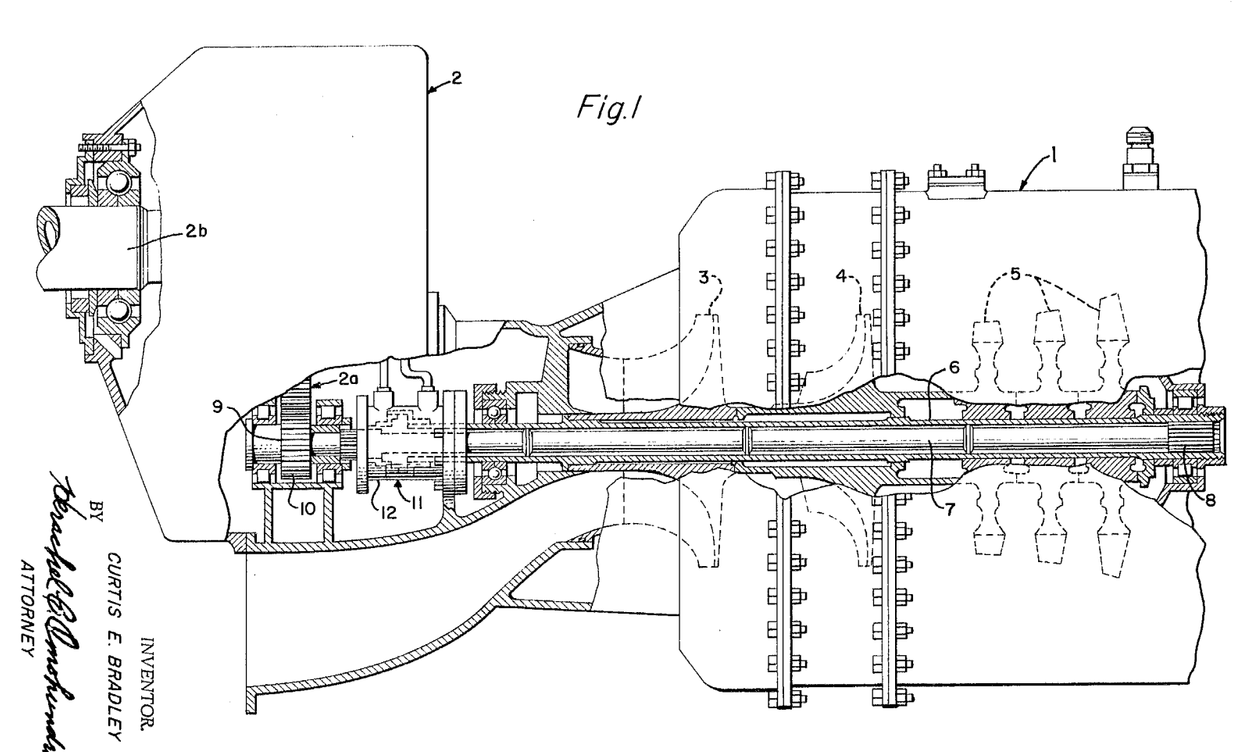
FIG. 1 of the drawing is an elevational view of a gas turbine engine and propeller drive with portions thereof shown in longitudinal section to reveal the disposition of the torque sensing mechanism forming part of the present invention.

Referring specifically to FIG. 1, a device shown comprises a gas turbine engine indicated generally by the numeral 1 and a propeller drive mechanism indicated generally by the numeral 2.

The gas turbine engine 1 comprises first- and second-stage radial compressor wheels 3 and 4, respectively. These wheels and a set of axial flow turbine wheels 5 are connected for rotation by a hollow cylindrical shaft portion 6 which extends axially therethrough and acts as a bolt for securing the assembly together into a unit. The compressor wheels 3 and 4 and turbine wheels 5, thus connected are journaled in suitable bearings located at each end of the assembly.

The propeller drive mechanism 2 comprises a speed reduction gear train, indicated generally by the numeral 2a, which transmits rotary motion and torque at a predetermined ratio from the engine to a propeller shaft 2b.

Since the turbine engine 1 and propeller drive 2 form no part of the present invention except to provide an operating complement therefor, many of the structural details have been omitted, the omitted portions being sufficiently conventional to be readily supplied by persons skilled in the turboprop art.

The invention used in conjunction with the turbine engine 1 and drive 2 comprises a torsionally resilient shaft 7 which is attached as at 8 to the turbine end of the rotor assembly for unitary rotation therewith and projects from its point of connection 8 through the hollow shaft portion 6 beyond the compressor end of the rotor assembly to a point of connection 9 with a pinion 10. The shaft 7 is thus disposed to transmit the power from the engine 1 to the propeller drive mechanism 2

Since the shaft 7 extends telescopically all the way through the rotor assembly to the propeller drive mechanism 2, greater length of the shaft is secured to permit considerably more twisting of the shaft 7 when torsional loads are applied thereto. Consequently, more differential angular movement between arbitrarily selected points of reference on the rotor assembly and the pinion 10 will be provided. The advantages gained by having this greater twist and differential angular movement will be made apparent by a description of the torque sensor which follows.

Figure 2:
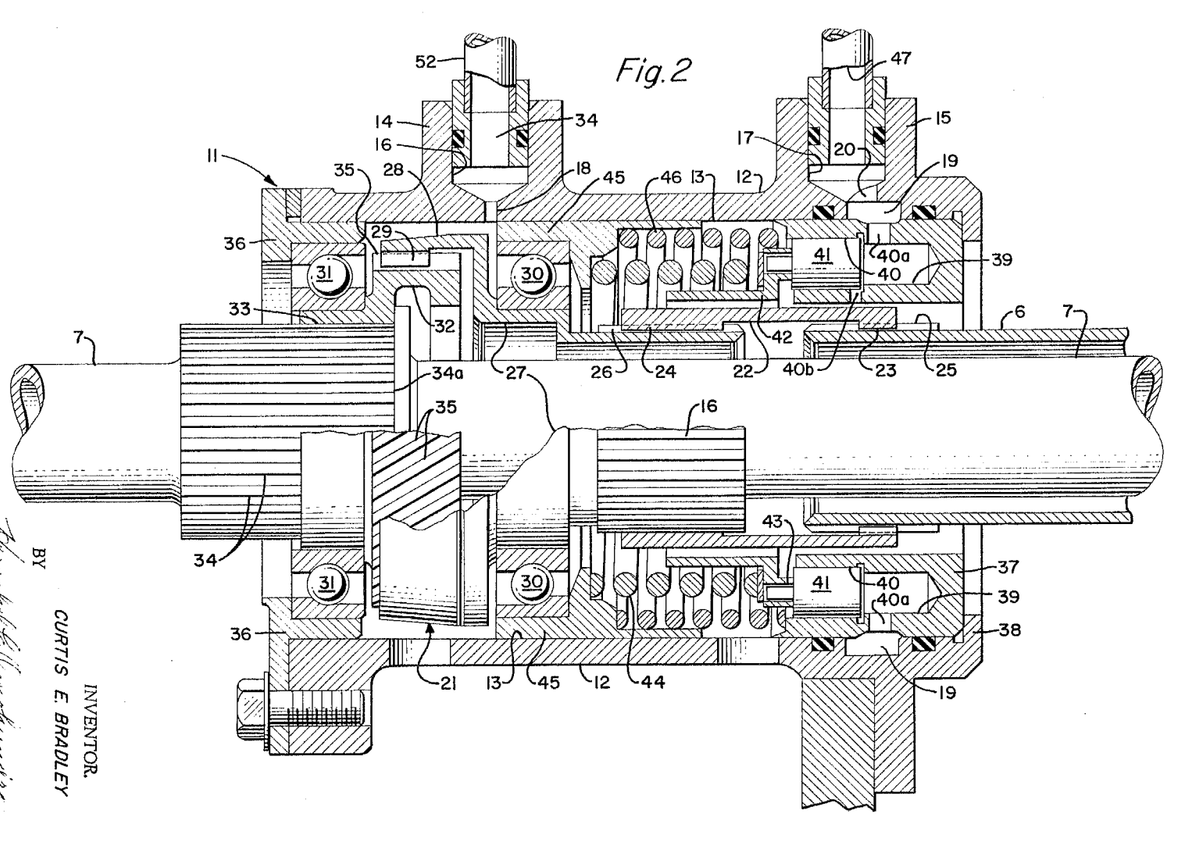
FIG. 2 is an enlarged axial sectional view of the torque sensing mechanism which constitutes a part of the invention.

The torque sensor, just mentioned, is indicated generally by the numeral 11 in FIG. 1 and is located between the forward end of the turbine 1 and the drive mechanism 2. FIG. 2 shows the torque sensor 11 in detail. It comprises a casing 12 having a bore 13 extending longitudinally therethrough. A pair of bosses 14 and 15 is formed at the top of the casing 12 and includes bores 16 and 17, respectively. A small port 18 is provided to establish communication between the interior of the casing 12 and the bore 16. An annulus 19 is formed in the casing 12, adjacent the bore 17, and communicates with the bore 17 via a passage 20.

As will be noted in FIGS. 1 and 2, the torque sensor casing 12 is mounted on a stationary portion of the turbine 1 and is disposed in coaxial alignment with the forward end of the shaft 7 and the axially extending shaft portion 6.

The working parts of the torque sensor 11 are contained in the casing 12. The means for translating relative angular deflections of torsionally coupled elements into linear motion is generally indicated by the numeral 21. This device comprises a coupling 22 formed to include internal splines 23 and 24. The splines 23 mesh with complemental splines 25 formed on the end of the cylindrical shaft portion 6. The other splines 24 mesh with complemental splines 26 which are formed on a torque sensing element 27. The element 27 is formed to include an axially extending flange portion 28 which has helical surfaces 29 provided internally thereof, and the entire element is journaled for rotation in an antifriction bearing 30. It should be noted that the coupling 22 establishes a connection between the rotating assembly and element 27 which will cause unitary rotation of said element with the rotor, but permits free axial movement of the element 27.

A second torque sensing element 32 is formed to include splines 33 which mesh with complemental splines 34 formed near the forward end of the resilient shaft 7. The sensor element 32 also includes helical surfaces 35 which mesh with the surfaces 29 on the element 27, cooperating therewith to translate relative angular movement between the two sensor elements into proportional axially directed linear movement of the element 27.

It will be noted that the sensor element 32 being splined to the shaft 7 will rotate in unison therewith, but is restrained against any axial movement by a shoulder 34a formed on the shaft 7 and bearing means 31 which are retained in position by a plate 36 secured to the forward end of the casing 12 by conventional means, such as bolts or screws, etc.

A ring 37 is disposed in the opposite end of the casing 12 and is retained against movement out of the casing by a flanged portion 38. The ring 37 is provided with a plurality of symmetrically spaced bores 39 which are counterbored at their outer ends as at 40 to provide valve plunger recesses. Passages 40a are provided in the ring 37 to establish communication between the bores 39 and the annulus 19. An orifice 40b is formed in the ring 37 to vent at least one of the bores 39 and passages connected therewith to a region of lower pressure, such as the interior of casing 12 which has one or more openings communicating with a hydraulic fluid pump.

In order to convert the mechanical motion of the torque sensor 21 into hydraulic forces, valve plungers 41 are provided which are disposed for reciprocation in the counterbored portions 40 of the bores 39. These valve plungers are retained by an equalizer ring 42 which has holes 43 formed therein to receive the reduced outwardly projecting ends of the valve plungers. A resilient member in the form of a helical spring 44 is disposed between the equalizer ring 42 and a sleeve valve 45, the latter being in supporting engagement with the outer race of the bearing 30 and disposed for reciprocation in the bore 13 to open or close the port 18.

Another resilient member, also in the form of a helical spring 46, extends between the ring 37 and a shoulder portion formed on the sleeve valve 45. This spring is provided to preload the bearing 30 and torque sensing elements 27 and 32 to eliminate any play or lost motion that might exist.

Figure 3:
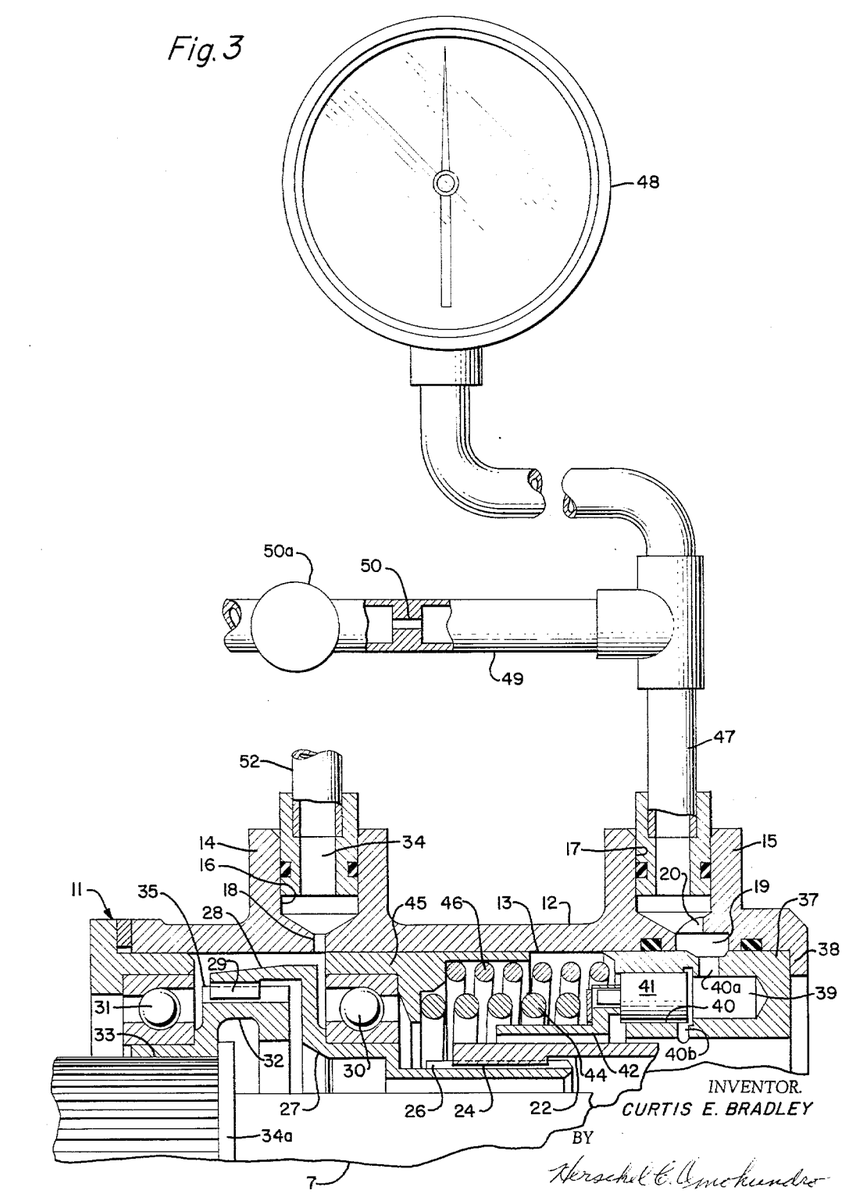
FIG. 3 is a schematic view of the hydraulic system used in the present invention to indicate positive torque.

FIG. 3 represents schematically the hydraulic system used with the torque sensing element to indicate the amount of positive torque being applied by the engine to the propeller. The lower portion of FIG. 3 contains a fragmentary sectional view of the torque sensor and translator shown in FIG. 2, and consequently the same numerals refer to like parts in both figures.

A line 47 is provided to establish communication between the bores 39 of the ring 37 and a fluid pressure transducer 48. This transducer may be of any conventional contruction having means responsive to differential pressures and a readout mechanism for converting the differential pressure into an indication of foot-pounds of torque. Supply line 49 establishes communication between the line 47 and a source (not shown) of fluid under pressure. When necessary, the supply line 49 may be provided with a restriction 50 and a pressure regulator 50a.

Fluid under pressure supplied to line 47 will be admitted to the pressure transducer 48 and to the bores 39 through passage 20, annulus 19, and passages 40a, the required amount of fluid being vented from the system through orifice 40b, when the engine is not driving the propeller, to maintain the pointer of the transducer on its calibrated zero torque indication.

Figure 4:
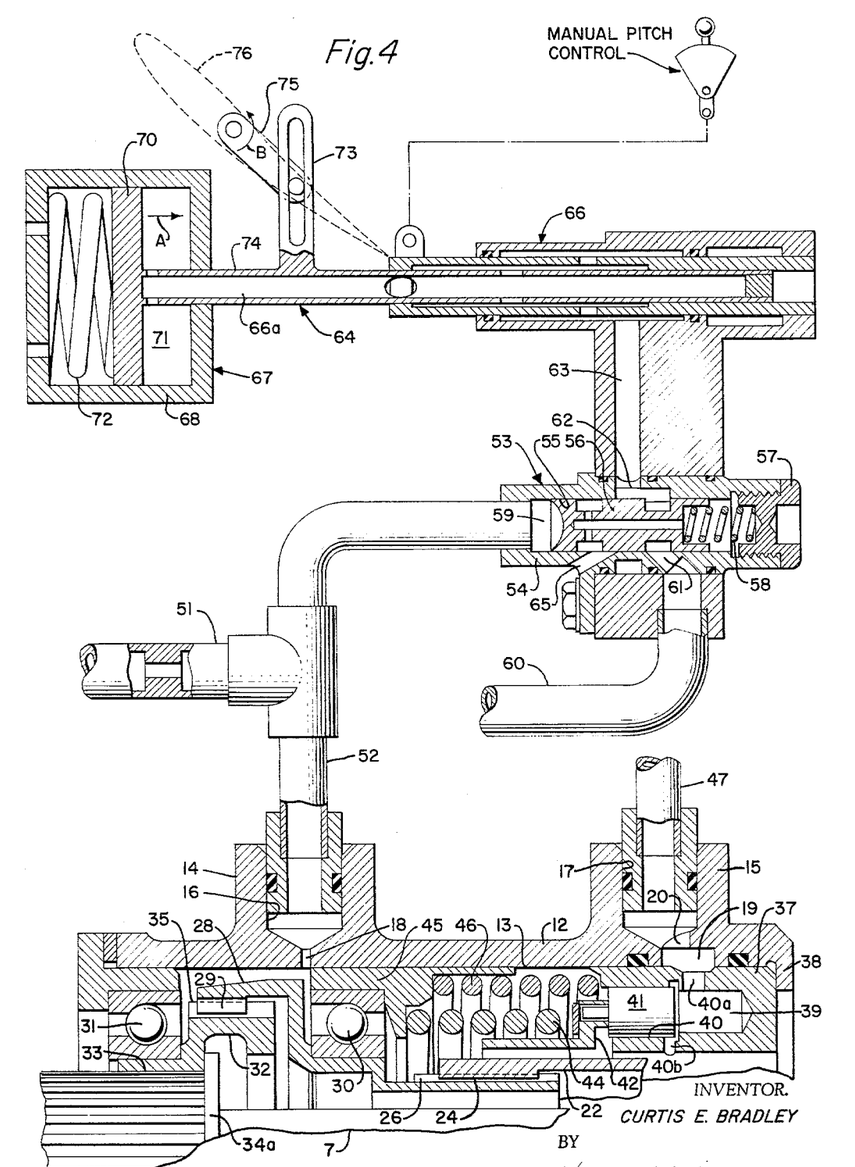
FIG. 4 is a schematic view of the hydraulic system used to convert negative torque into a pressure reference for controlling the pitch of a propeller.

FIG. 4 shows a hydraulic system comprising a supply line 51 which establishes communication between a source (not shown) of fluid under pressure and a line 52. The latter is provided to establish communicaion between the port 18 in the torque sensing mechanism and one end of a spool valve mechanism indicated generally by the numeral 53.

The mechanism 53 comprises a housing 54 formed to include a cylindrical bore 55 which receives a spool valve element 56 for reciprocation therein. A cap or plug 57 is threaded into and closes one end of the housing 54. A spring 58 is disposed between the plug 57 and one end of the spool valve 56 to resiliently urge the latter in one direction. A chamber 59 is defined between the housing 54 and one end of the valve 56. The chamber 59 is supplied with fluid under pressure via the supply line 51 and the line 52 to move valve 56 in opposition to the force of spring 58.

A line 60 is provided to establish communication between a source of fluid under pressure and a port 61 formed in the housing 54. Another passage 62 is formed in the housing 54 and when the valve 56 is in the position shown in the drawing, communication is established between port 61 and passage 62 to supply fluid under pressure to a passage 63, the latter leading from passage 62 to a propeller pitch control actuating mechanism indicated generally by the numeral 64. A vent 65, formed in the housing 54, establishes communicaion between the interior of this housing and a fluid return system which is not shown since it is a part of the gas turbine engine oil scavenge mechanism.

The propeller control actuating mechanism comprises a fluid transfer box 66 and an actuator 67. The latter comprises a closed cylindrical housing 68 which receives a piston 70 for reciprocation therein. The piston 70 cooperates with the housing 68 to define a fluid receiving chamber 71. Opposite the chamber 71 is a spring 72 which resiliently urges the piston 70 in a direction to reduce the size of the chamber 71. An arm 73 extends from a piston rod 74 to a point of connection with a crank 75, said crank being fixed to a portion of the root of a propeller blade 76 which is pivotable about an axis extending longitudinally of the blade.

Referring again to FIGS. 1 and 2, it will be seen that rotary power is normally transmitted from the turbine engine 1 to the propeller drive mechanism 2 through the torisionaly resilient shaft 7. If the propeller drive 2 offers any resistance to the rotary output of the engine, the shaft 7 will be twisted an amount which is exactly proportional to the torque required for overcoming this resistance. Since the torque sensor element 27 is fixed for unitary rotation with one end of the turbine rotor assembly, and the torque sensing element 32 is fixed for unitary rotation with the forward end of the shaft 7, any amount of twist along the length of the shaft 7 will result in differential angular displacement between the sensor elements 27 and 32. The angular displacement of one sensor element relative to the other is substantially equal to the twist between the opposite ends of the shaft 7. Since the elements 27 and 32 are mutally connected by meshing helical cam surfaces, splines, or threads 29 and 35, differential angular movement between the two elements will automatically be translated into axial movement of the element 27 which is proportional to its angular displacement.

Axial movement of the element 27 is transmitted through the bearing 30 to the valve 45. When the movement of the sensor element 27 is in the direction opposed to the force exerted thereagainst by the springs 44 and 46, spring 44 will press against the ring 42 with increased force, causing the later to urge the valves 41 toward the right (as viewed in FIG. 2) in opposition to the force exerted by the fluid pressure in chambers formed by the bores 39. Although the actual stroke of the valves 41 is very short, their movement toward the steps between the bores 39 and counterbored portions 40 will restrict fluid flowing to the interior of the casing through orifice 40b and cause a rise in the fluid pressure in bores 39 which is proportional to the torque. The pressure change thus produced in bores 39 is transmitted through the annulus 19 and passages 40a into line 47 (FIG. 3). The line 47 consequently will transmit fluid pressure changes to the transducer 48 for translation into an indication of torque.

The pressure changes in the system shown in FIG. 3, resulting from axial movement of the element 27, are the results of changes in positive torque, that is, torque being transmitted from the turbine engine 1 to the propeller drive 2. Increasese in positive torque always result in moving the element 27 against the forces of springs 44 and 46, consequently increasing the forces exerted by the spring 44 against the ring 42 and valves 41, which in turn increases the fluid pressure in the chambers formed by the bores 39.

Reduction in the amount of positive torque transmitted by the shaft 7 will cause a proportional reduction in the twist of this shaft to reposition the sensor element 27 and cause relaxation of the force exerted by spring 44 against the ring 42 and valves 41 with a consequent reduction of pressure in the hydraulic system associated therewith.

Under certain circumstances, the propeller may be induced to overrun the engine, i.e., the propeller will attain a speed which causes it to transmit power back through the drive mechanism 2 and shaft 7 into the engine. The above condition may result from many circumstances, the most common of which is produced by headwind gusts or by simultaneously diving the aircraft and possibly reducing the power output of the engine.

When the above-stated condition occurs, negative torque is produced. Twisting of the shaft 7 by negative torque will move all of the parts in the torque sensing mechanism in a direction opposite to that caused by positive torque; that is, differential angular displacement between the sensor elements 27 and 32 will cause the element 27 to move in the same direction as the force of spring 44. Since the bearing 30 and sleeve valve 45 are movable axially with the axial movement of the element 27, the springs 44 and 46 will urge said valve to follow axial movement of the element 27 and the edge of the valve 45 will begin closing the port 18.

It will be noted from the schematic in FIG. 4 that fluid will flow from a source of pressure through lines 51 and 52 to exhaust as long as the port 18 is open. As this port is being closed by the valve 45, the flow through lines 51 and 52 to exhaust will become restricted, causing a pressure rise therein which will act through the line 52 to increase the fluid pressure in the chamber 59. An increase in pressure in chamber 59 will act against the valve 56 in opposition to the force exerted on said valve by the spring 58. This displacement of the valve 56 will tend to close the port 61 and establish communication between the annulus 62 and the vent 65. Since the annulus 62 is in communication with the line 63, the latter will also be connected hydraulically with the vent 65, causing a reduction in pressure therein which is transmitted via the transfer box 66 and line 66a to the chamber 71. As the pressure is reduced in chamber 71, the force of the spring 72 will move the piston 70 in a direction indicated by the arrow "A" until equilibrium between the forces exerted by fluid pressure in chamber 71 and the spring 72 is restored. Movement of the piston 70 will rotate the crank 75 about its pivotal axis, as indicated by the arrow "B", to increase the pitch of the propeller 76 to an amount that will substantially cancel the windmilling effect of the propeller and arrest the negative torque created by this effect.

When negative torque has been arrested, all elements in the torque sensor mechanism affected by changes in torque will reach a position of equilibrium to stabilize the hydraulic pressures in the system and hold the propeller in its new position until a new external condition which would cause a change in torque is presented. An important feature of the present invention is that the pitch of the propeller is changed only enough to remove excessive negative torque. The pitch change is always proportional to the negative torque whereby a small amount of negative torque produces a small compensating pitch change and a large negative force produces a large pitch change. Contrary to many prior devices, the present invention never commits the propeller to the full feather position upon sensing a small negative torque condition.

In the form of the invention just described, the torque meter has torque sensing elements and valve means which are coaxially arranged, and these parts are also disposed in coaxial relationship with the rotor and drive shaft of the gas turbine engine. In some installations it may be impractical or inconvenient to locate the torque meter on the axis of the gas turbine engine. In such instances, the device may be disposed at one side of the engine axis and have the rotary motion of the engine rotor and torsionally resilient drive shaft transmitted thereto by gear means. Such an installation has been shown in FIGS. 5 and 6. The torque meter 77 is substantially identical, in principle of operation and construction, with the form shown in FIGS. 1 to 4. The torque sensing elements 27a and 32a are directly driven by the engine rotor and drive shaft, respectively, through intermeshing gear means 90, 91 and 92, 93, respectively, provided on these parts. As in the form of torque meter first described, the sensing elements and valve parts 12a, 37a and 45a are coaxially arranged with one another. Also, as in the first form of the invention, the sensing elements 27a and 32a are provided with interengaging helical spline or cam elements 29a and 35a, respectively, which serve to translate relative angular movement between the elements into axial movement of one of the elements. In the modified form, sensing element 32a moves axially when relative angular movement takes place. This axial movement is transmitted via a stem 78 to valve plunger 45a to move it relative to part 12a. The latter part constitutes a stationary valve part which is suitably secured to the engine frame. It has a port 18a conforming in purpose and operation to port 18 in the form of the invention first described. Part 12a is also provided with a passage 80 which establishes communication between fluid line 47a and an annular groove 81 formed in valve part 37a, this part being in the form of a piston disposed for sliding movement in a bore 82 in part 12a. Part 37a has a shoulder 83 formed internally thereof for cooperation with the end of valve plunger 45a to control fluid flow from fluid line 47a to a sump (not shown) through a port 84 formed in part 12a. It will be noted from the drawing that a spring 85 is positioned between valve part 37a and a plug 86 adjustably positioned in the bore 82. Spring 85 tends to urge the piston valve part 37a toward plunger 45a whereby shoulder 83 will engage the end of the plunger and resist fluid flow to port 84. The resistance to fluid flow causes the fluid pressure to increase until the force applied thereby to piston 37a overcomes that of spring 85 and fluid will escape through port 84. The pressure of the fluid at this time will exist in all regions communicating with the chamber upstream of the valve seat formed by shoulder 83, including fluid line 47a. Since line 47a corresponds to line 47 of FIG. 3, the pressure in line 47a will be applied to pressure transducer 48 to indicate the torque being applied by the engine to the load. Longitudinal movement of the sensor 32a, in response to variation in positive torque transmitted by the engine, will cause plunger 45a to move toward or away from shoulder 83, thus loading or unloading spring 85 and varying the fluid pressure transmitted via line 47a to the transducer 48. It will be obvious that this operation is substantially identical with the corresponding operation of the form of the invention first described. It should also be obvious that negative torque caused by the load tending to drive the engine will be felt by the sensor elements 27a and 32a and will cause movement of plunger 45a in a direction to block port 18a. As a result, pressure will increase in this port, passage 52a, and other passages communicating therewith to cause the automatic operation of the propeller feathering mechanism. This function is also substantially identical with that of the form of invention first described.

Figure 5:
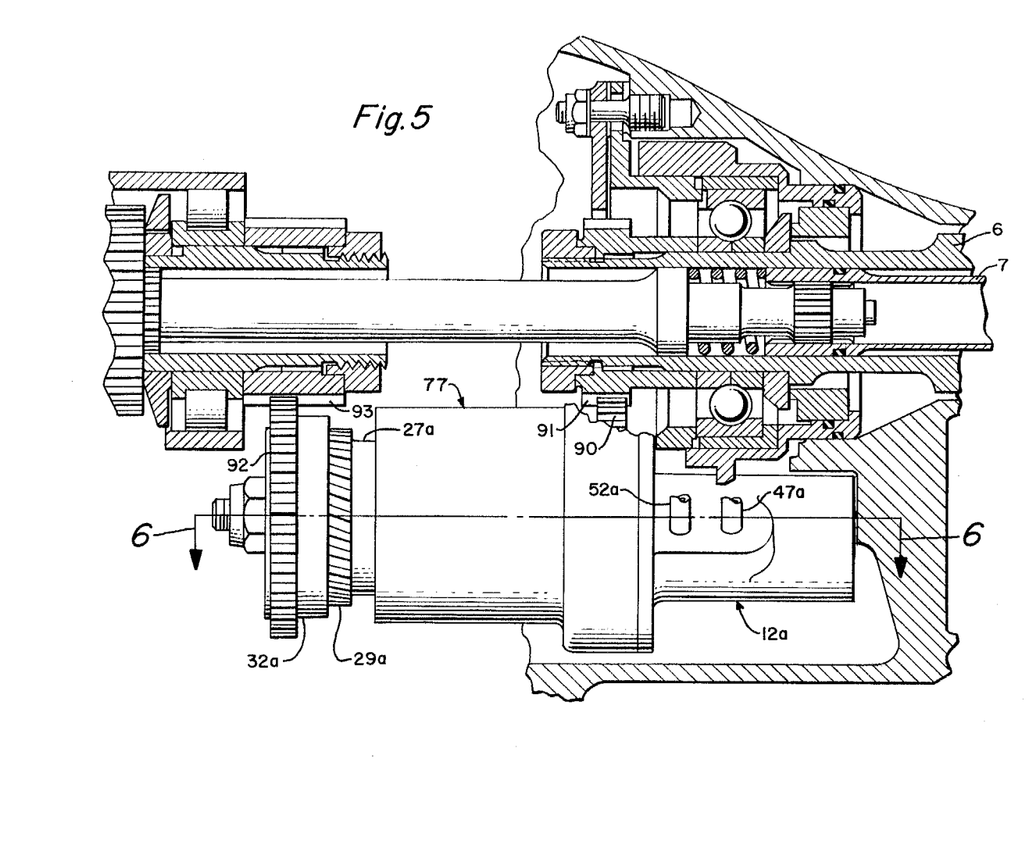
FIG. 5 is a fragmentary axial sectional view of a gas turbine engine provided with a modified form of torque sensor embodying the principles of the present invention, the torque sensor mechanism being shown in side elevation.
Figure 6:
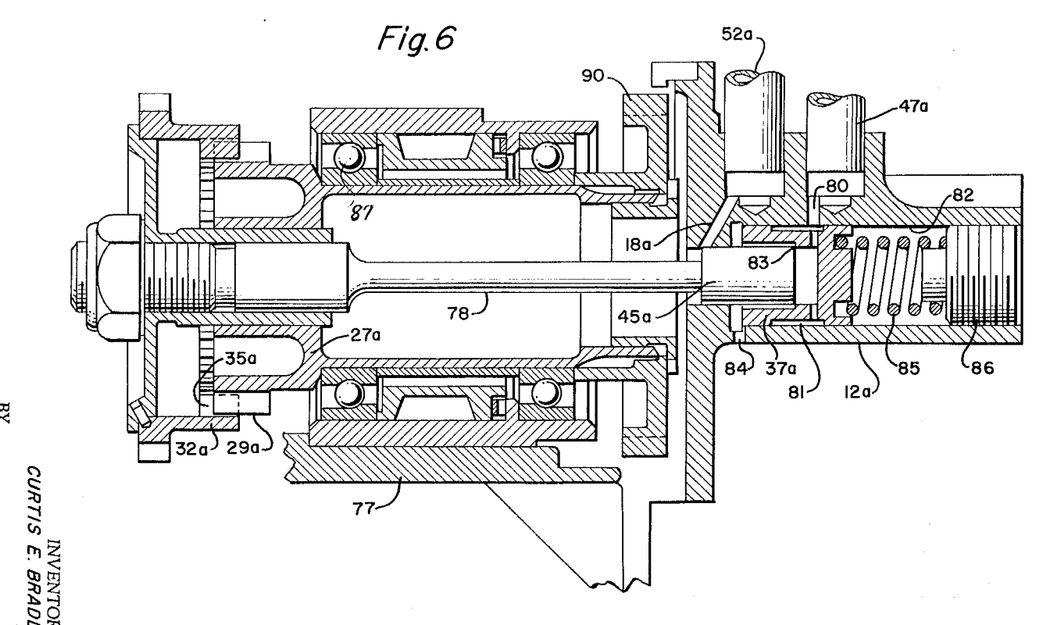
FIG. 6 is an axial sectional view of the modified form of torque sensor shown in FIG. 5, the plane of the section being indicated by the line 6—6 of such figure.

The modified form of torque meter differs slightly from the form first described in that the sensor element 27a is not axially movable and is journalled in bearings 87 which do not move axially. The constructions are otherwise substantially the same. In each form a valve mechanism is resiliently loaded by positive torque to be responsive to fluid pressure to effect operation of a torque indicating transducer. Each also has a valve mechanism responsive to negative torque to effect the operation of a propeller feathering means. The modified form of torque sensing mechanism has the advantage that it may be more easily serviced or removed and replaced than the form first described, due to the fact that it does not surround parts of the engine rotor and drive shaft. Some of the parts may also be made smaller and therefore lighter in weight. Other advantages may also be suggested by the foregoing description and the accompanying claims.

I claim:
1. Propeller pitch control apparatus, comprising:
    (a) a gas turbine engine having a hollow rotor assembly;
    (b) a torsionally resilient drive shaft fixed to one end of said rotor assembly and extending axially through said rotor assembly beyond the opposite end thereof to a point of connection with a propeller drive whereby the twist of said shaft under torsional loads will result in changes of relative angular positions of said rotor assembly and the propeller drive, these angular changes being directly proportional to the torque applied to the propeller drive by the engine;
    (c) a first torque sensing element having one portion thereof formed for connection with said rotor, which connection causes unitary rotation of said element with said rotor and permits axial movement of said element;
    (d) helical surfaces formed on a portion of said first torque sensing element;
    (e) a second torque sensing element secured for unitary rotation with said torsionally resilient drive shaft;
    (f) helical surfaces formed on said second torque sensing element for cooperation with the helical surfaces of said first torque sensing element to translate changes of angular position between said rotor and said propeller drive;
    (g) antifriction bearing means disposed to support a journal portion of said first torque sensing element, said bearing means being movable axially with said first torque sensing element;
    (h) a sleeve valve disposed coaxially with said drive shaft and resiliently urged into engagement with a portion of said bearing means, said valve being axially movable in unison with said first torque sensing element and said bearing means;
    (i) a casing formed to receive said sleeve valve and serve as a guide therefor;
    (j) means forming a port in said casing, the open area of said port being variable with the axial movement of said sleeve valve;
    (k) passage means for establishing communication between said valve means and a source of fluid under pressure, the pressure in said passage being variable with changes in the position of said valve; and
    (l) propeller pitch varying means constructed to be responsive to the fluid pressure changes in said passage means.
2. Propeller pitch control apparatus, comprising:
    (a) means for torsionally connecting an engine with a propeller drive;
    (b) a first sensor element disposed for synchronous movement with the power output portion of the engine;
    (c) a second sensor element disposed for synchronous movement with the propeller drive, said second element being engaged with said first element;
    (d) means in at least one region of engagement of said sensor elements for translating any differential angular movement between said elements into proportional axially directed displacement of at least one sensor element;
    (e) valve means disposed coaxially relative to said sensor elements and axially movable in unison with the axially movable portion of one of said sensing elements;
    (f) a casing formed to receive said valve and serve as a guide therefor, said casing having a port formed therein, the area of said port being variable upon predetermined axial movement of said valve means;
    (g) first passage means for establishing communication between said port and a source of fluid under pressure;
    (h) a restriction in said first passage means between said source and said port to permit fluid pressure reductions in said first passage means with an increase in the open area of said port;

(i) second passage means for establishing communication between a source of fluid under pressure and a propeller pitch varying actuator, such actuator being constructed to move the propeller pitch toward feather with a decrease in the fluid pressure of said second passage means and toward low pitch with an increase in the fluid pressure of said second passage means; and (j) a spool valve mechanism constructed for actuation by fluid pressure changes in said first passage means and disposed to control the fluid pressures in said second passage means by connecting said second passage to a vent when the pressure starts to rise in said first passage and thereby cause a decrease in the fluid pressure in said second passage.

3. Propeller pitch control apparatus, comprising:
(a) means for torsionally connecting an engine with a propeller drive;
(b) a first sensor element disposed for synchronous rotation with the engine;
(c) a second sensor element disposed for synchronous rotation with the propeller drive, said elements being coaxially arranged and having the second element engaged with said first element;
(d) means in at least one region of engagement of said sensor elements for translating any differential angular movement between said elements into proportional linear displacement of at least one sensor element;
(e) valve means disposed coaxially with and engaged for actuation by the linear displacement of said one sensor element;
(f) passage means for establishing communication between said valve means and a source of fluid under pressure, the pressure in said passage being variable with changes in the position of said valve; and
(g) propeller pitch varying means constructed to be responsive to the fluid pressure changes in said passage means.

4. Propeller pitch control apparatus, comprising:
(a) means for torsionally connecting an engine with a propeller drive;
(b) a first sensor element disposed for synchronous movement with the power output portion of the engine;
(c) a second sensor element disposed for synchronous movement with the propeller drive, said elements being coaxially arranged and having the second element engaged with said first element;
(d) means in at least one region of engagement of said sensor elements for translating any differential angular movement between said elements into proportional axially directed movement of one sensor element;
(e) valve means disposed coaxially with and axially movable in unison with one of said sensor elements;
(f) a casing formed to receive said valve means, said casing having a port formed therein, the area of said port being varied by axial movement of said valve means;
(g) passage means for establishing communication between said port and a source of fluid under pressure;
(h) a restriction in said passage means between said source and said port to permit fluid pressure reductions in said passage means with an increase in the open area of said port; and
(i) propeller pitch varying means responsive to fluid pressure changes in said passage means.

5. Propeller pitch control apparatus, comprising:
(a) a shaft for torsionally connecting an engine with a propeller drive whereby the twist of said shaft under torsional loads will result in changes of relative angular positions between the engine and propeller drive, these angular changes being directly proportional to the torque applied to said shaft;
(b) a first sensor element engaged for synchronous movement with the engine;
(c) a second sensor element engaged for synchronous movement with the propeller drive;
(d) complemental helical surfaces formed on both the first and second sensor elements, said surfaces cooperating to translate any differential angular movement between said engine and propeller drive into proportional axially directed movement of at least one of said sensor elements;
(e) valve means disposed in coaxial relationship to said shaft and engaged for axial movement in unison with said one sensor element;
(f) a casing formed to receive said valve means, said casing having a port formed therein, the area of said port being variable with the axial movement of said valve means;
(g) passage means for establishing communication between said port and a source of fluid under pressure;
(h) a restriction in said passage means between said source of fluid pressure and said port to permit fluid pressure reduction in said passage means with an increase in the open area of said port; and
(i) propeller pitch varying means operatively connected between said valve and said source and constructed to be responsive to fluid pressure variations in said passage means.

6. Propeller pitch control apparatus, comprising:
(a) a gas turbine engine having a hollow rotor assembly;
(b) a torsionally resilient drive shaft fixed to one end of said rotor assembly and extending axially through said rotor assembly beyond the opposite end thereof to a point of connection with a propeller drive whereby the twist of said shaft under torsional loads will result in changes of relative angular positions of said rotor assembly and the propeller drive, these angular changes being directly proportional to the torque applied to the torsionally resilient drive shaft;
(c) a first torque sensing element having one portion thereof formed for connection with said rotor assembly, which connection causes unitary rotation of said element with said rotor and permits axial movement of said element;
(d) helical surfaces formed on a portion of said first torque sensing element;
(e) a second torque sensing element coaxially disposed relative to said first torque sensing element and secured for unitary rotation with said torsionally resilient drive shaft;
(f) helical surfaces formed on said second torque sensing element for cooperation with the helical surfaces of said first torque sensing element to translate changes of angular position between said rotor and said propeller drive;
(g) antifriction bearing means disposed to support a journal portion of said first torque sensing element, said bearing means being movable axially with said first torque sensing element;
(h) a sleeve valve coaxially disposed relative to said drive shaft and resiliently urged into engagement with a portion of said bearing means, said valve being axially movable in unison with said first torque sensing element and said bearing means;
(i) a casing formed to receive said sleeve valve and serve as a guide therefor, said casing having a port formed therein, the area of said port being variable upon axial movement of said sleeve valve;
(j) first passage means for establishing communication between said port and a source of fluid under pressure;
(k) a restriction in said first passage means between said source and said port to permit fluid pressure reductions in said first passage means with an increase in the area of said port;

(l) second passage means for establishing communication between a source of fluid under pressure and a propeller pitch varying actuator, said actuator being constructed to move the propeller pitch toward feather with a decrease in the fluid pressure of said second passage means and toward low pitch with an increase in the fluid pressure of said second passage means; and (m) a spool valve mechanism constructed for actuation by fluid pressure changes in said first passage means and disposed to control the fluid pressures in said second passage means by connecting said second passage to a vent when the pressure starts to rise in said first passage and thereby cause a decrease in the fluid pressure in said second passage.

7. Propeller pitch control apparatus, comprising:

(a) a torsionally resilient drive shaft adapted to be secured at one end to one end of the rotor of a gas turbine engine and extended through such rotor for attachment at the opposite end to a propeller drive mechanism, the angular relation of the latter end of said drive shaft and the adjacent end of the engine rotor changing in direct proportion to the torque load imposed on said shaft by said propeller drive;

(b) coaxial first and second torque sensing elements adapted to be operatively connected with the propeller drive end of said shaft and the adjacent end of said engine rotor, respectively;

(c) interengaging means on said first and second torque sensing elements for translating relative rotary movement therebetween into linear movement of one of said elements;

(d) valve means disposed in coaxial relationship to said torque sensing elements and having relatively movable flow controlling members, one of said members being engaged for movement with the linearly movable torque sensing element; and (e) fluid pressure responsive propeller pitch varying means in fluid communication with said valve means to be governed by the operation of the latter in response to torque sensed by said sensing elements.

8. Propeller pitch control apparatus, comprising:

(a) a torsionally resilient drive shaft adapted to be secured at one end to one end of the rotor of a gas turbine engine and extended through such rotor for attachment at the opposite end to a propeller drive mechanism, the angular relation of the latter end of said drive shaft and the adjacent end of the engine rotor changing in direct proportion to the torque load imposed on said shaft by the propeller drive;

(b) coaxial first and second torque sensing elements formed for rotary movement with the propeller drive end of said shaft and the adjacent end of the engine rotor, respectively;

(c) interengaging means on said first and second torque sensing elements for translating relative rotary movement therebetween into linear movement of one of said elements;

(d) valve means disposed in coaxial relationship with said drive shaft and having relatively movable flow controlling members, one of said members being engaged for movement with the linearly movable torque sensing element;

(e) fluid pressure responsive signal producing means having a control element disposed for operation by said linearly movable element when said shaft means is twisted in one direction; and (f) a fluid pressure responsive propeller pitch varying means having a control element disposed for actuation by said linearly movable element when said shaft means is twisted in a reverse direction.

9. Propeller pitch control apparatus, comprising:

(a) a torsionally resilient drive shaft adapted to be secured at one end to one end of the rotor of a gas turbine engine and at the opposite end to a propeller drive mechanism, the angular relation of the latter end of the drive shaft and a predetermined portion of the engine rotor changing in direct proportion to the torque load imposed on said shaft by the propeller drive;

(b) coaxial first and second torque sensing elements operatively connected with the propeller drive end of said shaft and said predetermined portion of said engine rotor, respectively;

(c) interengaging means on said first and second torque sensing elements for translating relative rotary movement therebetween into linear movement of one of said elements;

(d) valve means disposed in coaxial relationship with said torque sensing elements and having relatively movable flow controlling members, one of said members being engaged for movement with the linearly movable torque sensing elements; and (e) fluid pressure responsive propeller pitch varying means in fluid communication with said valve means to be governed by the operation of the latter in response to torque sensed by said sensing elements.

10. Propeller pitch control apparatus, comprising:

(a) a torsionally resilient drive shaft adapted to be secured at one end to one end of the rotor of a gas turbine engine and at the opposite end to a propeller drive mechanism, the angular relation of the latter end of the drive shaft and a predetermined portion of the engine rotor changing in direct proportion to the torque load imposed on said shaft by the propeller drive;

(b) coaxial first and second torque sensing elements operatively connected with the propeller drive end of said shaft and said predetermined portion of said engine rotor, respectively;

(c) interengaging means on said first and second torque sensing elements for translating relative rotary movement therebetween into linear movement of one of said elements;

(d) valve means disposed in coaxial relationship with said torque sensing elements and having relatively movable flow controlling members, one of said members being engaged for movement with the linearly movable torque sensing elements;

(e) means resiliently loading a portion of said valve means to vary the fluid pressure controlled thereby, said resiliently loaded means being adjusted by the movement of said linearly movable torque sensing element; and (f) fluid pressure responsive propeller pitch varying means in fluid communication with said valve means to be governed by the operation of the latter in response to torque sensed by said sensing elements.

11. Propeller pitch control apparatus, comprising:

(a) a torsionally resilient drive shaft adapted to be secured at one end to one end of the rotor of a gas turbine engine and at the opposite end to a propeller drive mechanism, the angular relation of the latter end of the drive shaft and a predetermined portion of the engine rotor changing in direct proportion to the torque load imposed on said shaft by the propeller drive;

(b) coaxial first and second torque sensing elements operatively connected with the propeller drive end of said shaft and said predetermined portion of said engine rotor, respectively;

(c) interengaging means on said first and second torque sensing elements for translating relative rotary movement therebetween into linear movement of one of said elements;

(d) valve means disposed in coaxial relationship with said torque sensing elements and having relatively movable flow controlling members, one of said members being engaged for movement with the linearly movable torque sensing element;

(e) spring means yieldably tending to maintain said valve means in a predetermined condition of operation, movement of said linearly movable torque sensing element serving to vary the effective force of said spring means; and
(f) fluid pressure responsive propeller pitch varying means in fluid communication with said valve means to be governed by the operation of the latter in response to torque sensed by said sensing elements.

12. In propeller pitch control apparatus of the type having an engine rotor and a torsionally resilient drive shaft adapted to transmit rotary motion from the engine rotor to a propeller drive mechanism, the angular relation of predetermined portions of the drive shaft and engine rotor changing in direct proportion to the torque load imposed on said shaft by the propeller drive, a torque sensing means, comprising:
(a) coaxially disposed first and second torque sensing elements operatively connected with the predetermined portions of the drive shaft and engine rotor and driven thereby;
(b) interengaging means on said first and second torque sensing elements for translating relative rotary movement therebetween into linear movement of one of said elements;
(c) valve means including a pair of members disposed in coaxial relationship with one another and with said torque sensing elements and operating to control fluid flow in response to the linear movement of said one torque sensing element; and
(d) means in fluid communication with said valve means for varying the pitch of a propeller in accordance with the torque sensed by said sensing elements.

13. In propeller pitch control apparatus of the type having an engine rotor and a torsionally resilient drive shaft adapted to transmit rotary motion from the engine rotor to a propeller drive mechanism, the angular relation of predetermined portions of the drive shaft and engine rotor changing in direct proportion to the torque load imposed on said shaft by the propeller drive, a torque sensing means, comprising:
(a) coaxially disposed first and second torque sensing elements operatively connected with the predetermined portions of the drive shaft and engine rotor and driven thereby;
(b) interengaging means on said first and second torque sensing elements for translating relative rotary movement therebetween into linear movement of one of said elements;
(c) valve means including a plurality of members disposed in coaxial relationship with one another and with said torque sensing elements, said valve members being relatively movable to control fluid flow in a plurality of branches of a fluid system in response to the linear movement of said one torque sensing element;
(d) spring means yieldably tending to maintain a part of said valve means in a predetermined condition of operation, movement of said linearly movable torque sensing element serving to vary the effective force of said spring means; and
(e) fluid pressure responsive means in said plurality of branches of a fluid system to be actuated in response to torque sensed by said sensing elements.

No references cited.

JULIUS E. WEST, *Primary Examiner.*